A. SOTO.
MACHINE FOR SOWING SEED.
APPLICATION FILED DEC. 18, 1908.
933,134.
Patented Sept. 7, 1909.
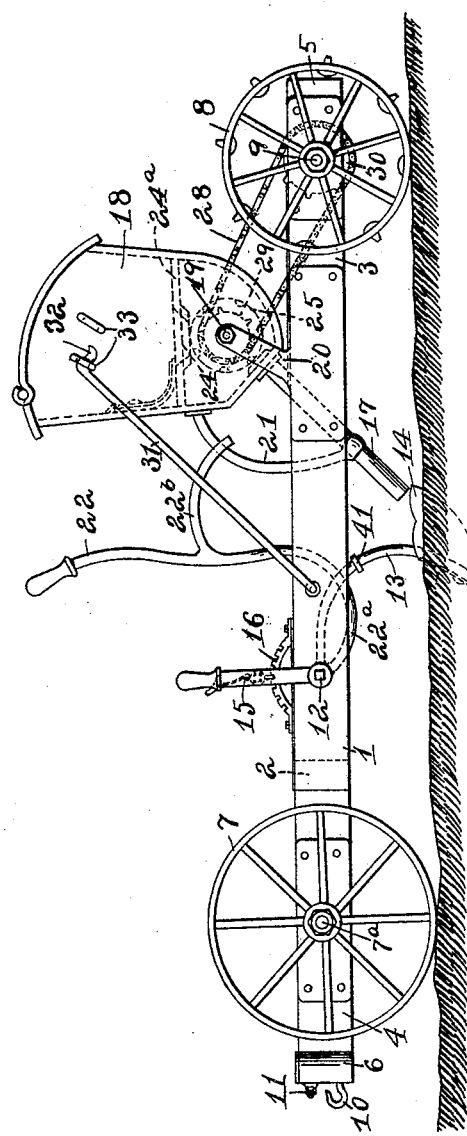
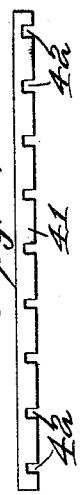
ATTEST.
INVENTOR.
APOLONIO SOTO.
BY Wm. Wallace White
ATTYS.

UNITED STATES PATENT OFFICE.

APOLONIO SOTO, OF MEXICO, MEXICO.

MACHINE FOR SOWING SEED.

933,134. Specification of Letters Patent. Patented Sept. 7, 1909.

Application filed December 18, 1908. Serial No. 468,138.

*To all whom it may concern:*

Be it known that I, APOLONIO SOTO, a citizen of Mexico, residing at Puente de San Antonio Abad No. 2613, city of Mexico, Federal District, Republic of Mexico, have invented new and useful Improvements in Machines for Sowing Seeds, of which the following is a specification.

This invention relates to a seed drilling machine.

The invention comprises the novel features of construction and arrangement and combination of parts hereinafter described and particularly set forth in the appended claims.

An embodiment of the invention is shown in the accompanying drawings in which:—

Figure 1 is a side view of the invention, and Fig. 2 is a view of one of the stops which serves the purpose of holding the mold boards or furrow openers in position.

Similar reference signs designate like parts in all figures.

Referring more particularly to the drawings, the machine comprises a main frame which is composed of side bars 1, connected by the cross bar 2 at the front end, and rear and front side bars 3 and 4, the rear side bars being connected at the rear end by cross bar 5 and the front side bars 4 being connected by the front cross bar 6. The front cross bar 6 is provided with hooks 10 or like devices, which serve for the attachment of any suitable draft device. Front supporting wheels 7 have their supporting shaft or axle 7$^a$ suitably journaled in the bars 4, while the rear supporting wheels 8 have their shaft or axle 9 journaled in suitable bearings carried by the rear side bars 3.

I prefer to make the front wheels of larger diameter than the rear wheels, so that the frame slopes slightly to the rear, as I find, by this arrangement, a more efficient action may be secured. In suitable bearings in the main frame, just in rear of the cross bar 2, I mount a rocking cross bar or shaft 12 to which are secured the beams or drag bars 13 of suitable drills 14. At one side this rock shaft carries a lever 15 which has a suitable dog traveling over a toothed sector 16 and adapted to engage with the notches to lock the shaft in position to hold the drill teeth at any desired elevation.

The seeds are fed to the channels or furrows opened by the drill teeth through delivery tubes 17 which receive the seeds from a hopper 18. This hopper 18 is mounted to rock upon a shaft 19 which is journaled in brackets 20 projecting upward from the main frame, the delivery tubes 17 being secured in the hopper and supported by brackets 21. A hand lever 22 has one portion 22$^a$ connected to the rock shaft 12 and another portion 22$^b$ connected to one of these brackets 21, so that by rocking the hand lever, the position of the plows or drills, the delivery tubes and the hopper may be all adjusted simultaneously, and if the drill device is not in drilling operation, but is being moved from one place to another, the drill teeth may be raised and the hopper tipped back and the delivery tubes elevated, the whole being locked in this position by the locking lever 15. The feed hopper has a bottom 24$^a$ in which are openings 24 through which the seed passes to the pockets of the said wheel.

The shaft 19, which is journaled in the hopper beneath the bottom 24$^a$, carries in proximity to each opening, a feed wheel 25, which has pockets therein adapted to receive the seed, said feed wheels 25 are fast on the shaft 19. The shaft 19 is driven by a sprocket chain 28 passing around a sprocket wheel 29 suitably mounted on this shaft, and a similar wheel 30 on the driving shaft or axle 9 of the rear wheels 8. These wheels may be provided with any suitable projections to prevent slipping. In order to further hold the hopper against rocking under the vibration caused by the travel of the machine, I provide a rod 31 at one or both ends, which, having an angular turned or hooked end 32, may be inserted in any one of the plurality of eyes 33 in the side wall of the hopper. In order to prevent independent side motion of the drag bars or beams of the drills, I provide a bar 41 having a series of notches or recesses 42 in which the beams rest.

I claim:—

1. In a device of the character described, the combination with a suitable supporting frame, of a rock shaft, drill teeth connected to said rock shaft, a hopper mounted to rock on said frame, delivery tubes adapted to rock in unison with said hopper and to receive the seed therefrom, means for simultaneously rocking said parts, means for locking said parts and holding them in their adjusted position, and means for controlling the feed of the seed from the hopper to the delivery tubes, substantially as described.

2. In a machine of the class described, the combination with the main supporting frame, of a rock shaft, drill teeth connected to said rock shaft, a feed hopper mounted to rock on the frame, delivery tubes connected to the feed hopper, an operating lever connected to both the feed hopper and rock shaft whereby they may be rocked in unison, a locking device connected to the rock shaft, and a separate locking device for rigidly connecting the feed hopper with the frame, substantially as described.

In testimony whereof I have signed my name to this specification in the presence of two subscribing witnesses.

APOLONIO SOTO.

Witnesses:
 FDEK HAYS,
 G. A. GUERRA.